United States Patent
Radhakrishnan et al.

(10) Patent No.: US 10,719,243 B2
(45) Date of Patent: Jul. 21, 2020

(54) TECHNIQUES FOR PRESERVING AN EXPECTED LIFESPAN OF A NON-VOLATILE MEMORY

(71) Applicant: Apple Inc., Cupertino, CA (US)

(72) Inventors: Manoj K. Radhakrishnan, Campbell, CA (US); Bhaskar R. Adavi, Sunnyvale, CA (US); Kaiehu H. Kaahaaina, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 13 days.

(21) Appl. No.: 16/136,164

(22) Filed: Sep. 19, 2018

(65) Prior Publication Data

US 2019/0369882 A1 Dec. 5, 2019

Related U.S. Application Data

(60) Provisional application No. 62/678,180, filed on May 30, 2018.

(51) Int. Cl.
*G06F 12/02* (2006.01)
*G06F 3/06* (2006.01)
(Continued)

(52) U.S. Cl.
CPC .......... *G06F 3/0616* (2013.01); *G06F 3/0659* (2013.01); *G06F 3/0679* (2013.01); *G06F 11/3037* (2013.01); *G06F 11/3442* (2013.01); *G06F 12/0246* (2013.01); *G06F 2212/1036* (2013.01)

(58) Field of Classification Search
None
See application file for complete search history.

(56) References Cited

U.S. PATENT DOCUMENTS

| 8,972,694 B1 | 3/2015 | Dolan et al. | |
| 9,026,720 B2 * | 5/2015 | Li | G06F 12/0246 709/224 |

(Continued)

OTHER PUBLICATIONS

International Patent Application No. PCT/US2019/027068—International Search Report and Written Opinion dated Aug. 6, 2019.

*Primary Examiner* — Brian R Peugh
(74) *Attorney, Agent, or Firm* — Dickinson Wright RLLP

(57) ABSTRACT

Disclosed herein is a technique for preserving an expected lifespan of a non-volatile memory that is communicably coupled with a computing device. According to some embodiments, the technique can be implemented by the computing device, and include (1) receiving metrics associated with the non-volatile memory, (2) for each application of a plurality of applications associated with the computing device: establishing, based on the metrics, a respective write budget for the application. According to some embodiments, the respective write budget for each application can be further based on a count of the plurality of applications. Additionally, the technique can further include (3) receiving, from an application of the plurality of applications, a write request directed to the non-volatile memory, and (4) in response to determining that the write request does not violate the respective write budget for the application: issuing the write request to the non-volatile memory.

20 Claims, 5 Drawing Sheets

(51) Int. Cl.
    *G06F 11/30*    (2006.01)
    *G06F 11/34*    (2006.01)

(56)            References Cited

U.S. PATENT DOCUMENTS

| | | |
|---|---|---|
| 9,070,481 B1 | 6/2015 | Eillis et al. |
| 2011/0099320 A1 | 4/2011 | Lucas et al. |
| 2013/0268921 A1 | 10/2013 | Brauneis et al. |
| 2014/0032825 A1 | 1/2014 | Jeddeloh |
| 2014/0089762 A1* | 3/2014 | Pangal ............... G06F 11/1008 714/773 |
| 2014/0156877 A1 | 6/2014 | Tylik et al. |
| 2014/0181363 A1 | 6/2014 | Hoang et al. |
| 2016/0210060 A1 | 7/2016 | Dreyer |
| 2017/0139605 A1 | 5/2017 | Shinozaki et al. |
| 2017/0329537 A1 | 11/2017 | Dees et al. |
| 2018/0039578 A1* | 2/2018 | Yun .................... G06F 12/1009 |

\* cited by examiner

TECHNIQUES FOR PRESERVING AN EXPECTED LIFESPAN OF A NON-VOLATILE MEMORY

CROSS-REFERENCE TO RELATED APPLICATIONS

The present application claims the benefit of U.S. Provisional Application No. 62/678,180, entitled "TECHNIQUES FOR PRESERVING AN EXPECTED LIFESPAN OF A NON-VOLATILE MEMORY," filed May 30, 2018, the content of which is incorporated herein by reference in its entirety for all purposes.

FIELD

The described embodiments set forth techniques for preserving an expected lifespan of a non-volatile memory (e.g., a solid state drive (SSD)) that is communicably coupled with a computing device. In particular, the techniques involve establishing write budgets for applications to control the wear rate on the non-volatile memory in accordance with its current health and expected lifespan.

BACKGROUND

Solid state drives (SSDs) are a type of storage device that share a similar physical footprint with (and provide similar functionality as) traditional magnetic-based hard disk drives (HDDs). Notably, standard SSDs—which utilize "flash" non-volatile memory—can provide various advantages over standard HDDs, such as considerably faster Input/Output (I/O) performance. For example, average I/O latency speeds provided by SSDs typically outperform those of HDDs because the I/O latency speeds of SSDs are less-affected when data is fragmented across the memory blocks of SSDs. This occurs because HDDs include a read head component that must be relocated each time data is read/written, which produces a latency bottleneck as the average contiguity of written data is reduced over time. Moreover, when fragmentation occurs within HDDs, it becomes necessary to perform resource-expensive defragmentation operations to improve or restore performance. In contrast, SSDs, which are not bridled by read head components, can preserve I/O performance even as data fragmentation levels increase. SSDs also provide the benefit of increased impact tolerance (as there are no moving parts), and, in general, virtually limitless form factor potential. These advantages—combined with the increased availability of SSDs at consumer-affordable prices—make SSDs a preferable choice for mobile devices such as laptops, tablets, and smart phones.

Despite the foregoing benefits provided by SSDs, some drawbacks remain that have yet to be addressed, including a phenomenon commonly known as "SSD wear" that affects the overall lifespan of SSDs. In particular, and as is well-known, the memory blocks of the SSDs can only have data written into them a threshold number of times before their overall reliability begins to degrade. Unfortunately, the nature in which SSDs operate—as well as the manner in which they are being utilized—is contributing to ever-increasing average numbers of write requests that are issued to SSDs, thereby compromising their expected lifespans. For example, the average number of applications installed on computing devices is increasing over time, which directly contributes to increased numbers of write requests that are issued to the SSD of the computing device. Moreover, such write requests are typically multiplied in volume as a result of write amplification that occurs due to fact that SSDs require all pages within a given block to be completely erased before new data is written into one or more of the pages. In particular, when the existing data within a pending-erase page needs to be retained within the SSD, additional write commands are required to migrate the existing data to a new storage area within the SSD, thereby exacerbating these issues.

Accordingly, what is needed is an approach for preserving an expected lifespan of a non-volatile memory that is communicably coupled with a computing device.

SUMMARY

One embodiment sets forth a method for preserving an expected lifespan of a non-volatile memory that is communicably coupled with a computing device. According to some embodiments, the method can be implemented by the computing device, and include the steps of (1) receiving metrics associated with the non-volatile memory, (2) for each application of a plurality of applications associated with the computing device: establishing, based on the metrics, a respective write budget for the application. According to some embodiments, the respective write budget for each application can be further based on a count of the plurality of applications. Additionally, the method can further include the steps of (3) receiving, from an application of the plurality of applications, a write request directed to the non-volatile memory, and (4) in response to determining that the write request does not violate the respective write budget for the application: issuing the write request to the non-volatile memory.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
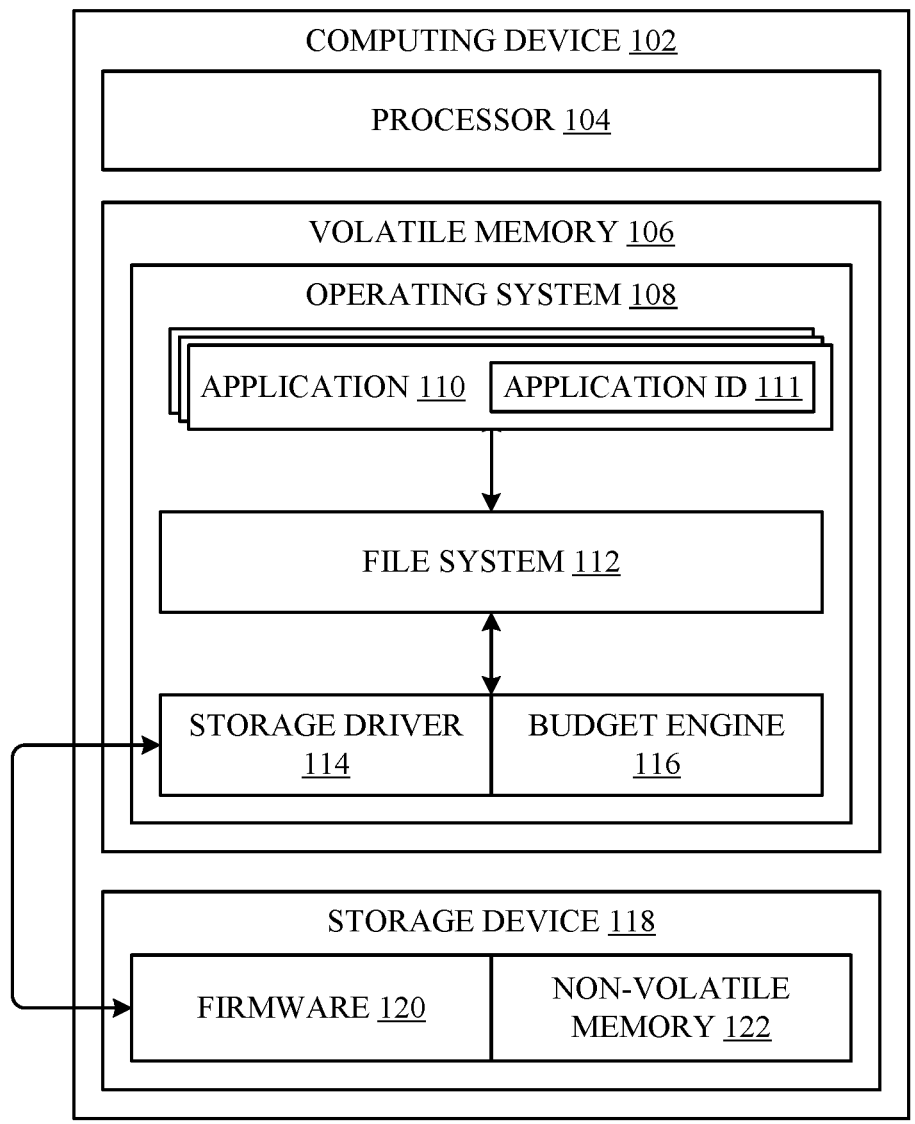
FIG. 1 illustrates a block diagram of a computing device that can be configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth a technique for preserving and expected lifespan of a non-volatile memory (e.g., a solid state drive (SSD)) that is communicably coupled with a computing device. According to some embodiments, the technique can be implemented by the computing device, and include the step of (1) receiving metrics associated with the non-volatile memory. According to some embodiments, the metrics can include at least one of the following properties associated with the non-volatile memory: write cycle information, program/erase (PE) cycle information, write amplification information, bad block information, overprovisioning information, storage capacity information, configuration type information, event information, or age information.

In turn, the foregoing metrics can be utilized to establish write budgets for a plurality of applications associated with the computing device. For example, the technique can further include the step of (2) for each application of a plurality of applications associated with the computing device: establishing, based on the metrics, a respective write budget for the application. According to some embodiments, the respective write budget for each application can be further based on a count of the plurality of applications. Additionally, the technique can further include the steps of (3) receiving, from an application of the plurality of applications, a write request directed to the non-volatile memory, and (4) determining whether the write request violates the respective write budget for the application. In particular, when the respective write budget for the application is not violated, the computing device can issue the write request to the non-volatile memory. Alternatively, when the respective write budget for the application is violated, the computing device can perform a variety of reactionary measures including, for example, (i) providing a notification to a user of the computing device/and or a developer of the application, (ii) delaying an issuance of the write request to the non-volatile memory, (iii) terminating the application, and so on.

A more detailed discussion of these techniques is set forth below and described in conjunction with the various accompanying drawings, which illustrate detailed diagrams of systems and methods that can be used to implement these techniques.

FIG. 1 illustrates a block diagram 100 of a computing device 102—e.g., a smart phone, a tablet, a laptop, a desktop, a server, etc.—that can be configured to implement the various techniques described herein. It should be understood that the various hardware components of the computing device 102 illustrated in FIG. 1 are presented at a high level in the interest of simplification, and that a more detailed breakdown is provided below in conjunction with FIG. 5. It should also be understood that the computing device 102 can include additional entities that enable the implementation of the various techniques described herein without departing from the scope of this disclosure. Is should additionally be understood that the entities described herein can be combined or split into additional entities without departing from the scope of this disclosure. It should further be understood that the various entities described herein can be implemented using software-based or hardware-based approaches without departing from the scope of this disclosure.

As shown in FIG. 1, the computing device 102 can include a processor 104 that, in conjunction with a volatile memory 106 (e.g., a dynamic random-access memory (DRAM)) and a storage device 118 (e.g., a solid-state drive (SSD), etc.), enables different software entities to execute on the computing device 102. For example, the processor 104 can be configured to load, into the volatile memory 106, various components for an operating system (OS) 108 that are stored in a non-volatile memory 122 of the storage device 118 by way of firmware 120 that executes on the storage device 118. In turn, the OS 108 can enable the computing device 102 to provide a variety of useful functions, e.g., loading/executing various software entities. Such entities can include, for example, one or more applications 110, a file system 112, a storage driver 114, and a budget engine 116. According to some embodiments, the applications 110 can represent any application configured to execute within the OS 108, e.g., system daemons, user applications, and so on, where each application 110 is associated with a respective unique application identifier (ID) 111.

Figure 2:
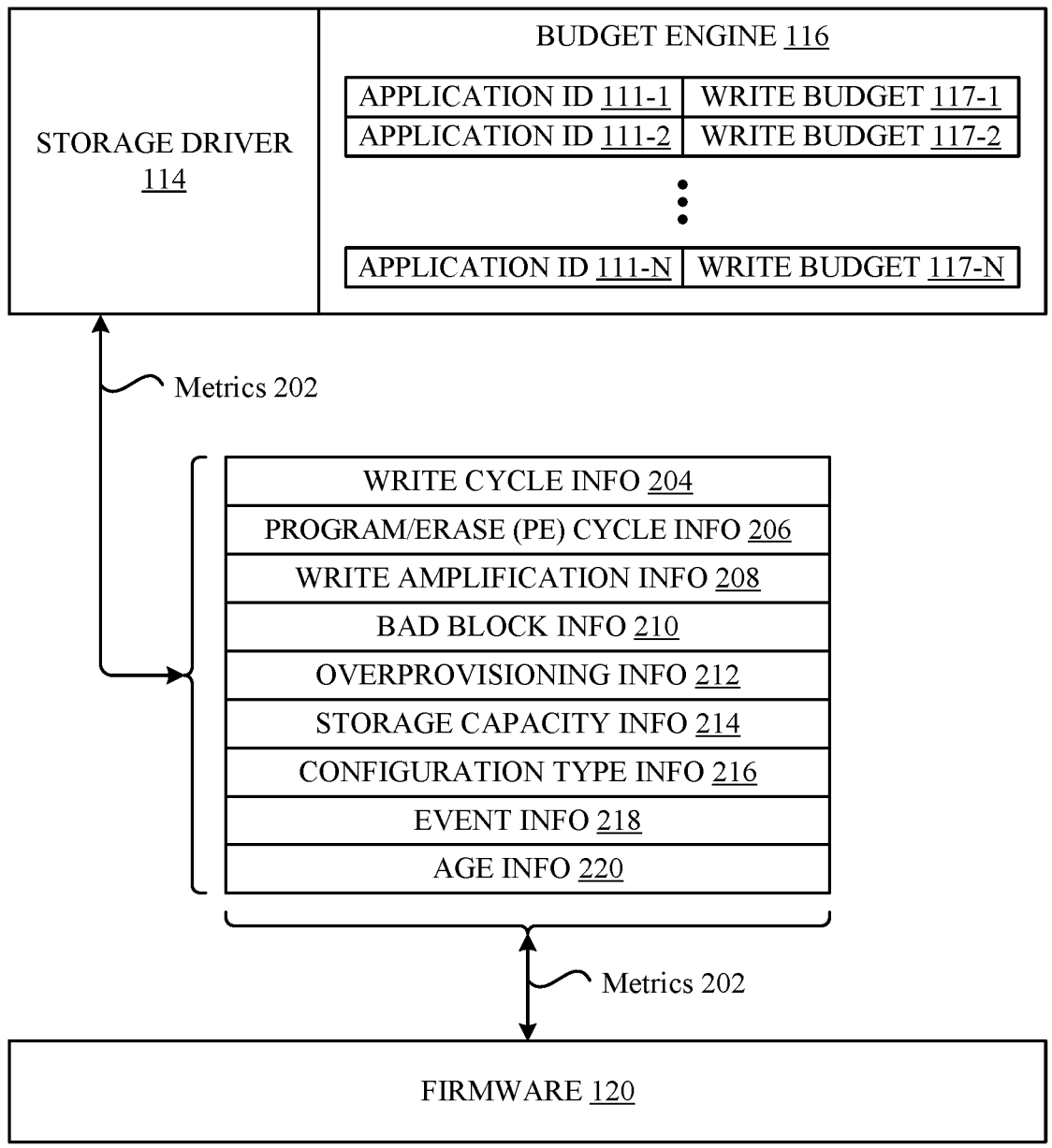
FIG. 2 illustrates a block diagram that provides additional context to the components of the computing device illustrated in FIG. 1, according to some embodiments.

According to some embodiments, and as shown in the block diagram 200 of FIG. 2, the storage driver 114 can be configured to interface with the budget engine 116, which generates write budgets 117 for the applications 110. A preliminary step in generating the write budgets 117 can involve the storage driver 114 receiving up-to-date operational information associated with storage device 118. As shown in FIG. 2, such operational information is represented by a collection of metrics 202 associated with the storage device 118, and can include write cycle information 204, program/erase (PE) cycle information 206, write amplification information 208, bad block information 210, overprovisioning information 212, storage capacity information 214, configuration type information 216, event information 218, and age information 220. According to some embodiments, the metrics 202 can be maintained by the firmware 120 that controls the overall operation of the storage device 118. Additionally, the metrics can be maintained by the storage driver 114—e.g., the metrics 202 can be programmed into the storage driver 114 when the storage device 118 is added to the computing device 102, and updated by the storage driver 114 throughout the operation of the storage device 118.

As a brief aside, it is noted that each metric 202 can represent a collection of values without departing from the scope of this disclosure. For example, the write cycle information 204 can include information about (1) write requests received by the firmware 120, (2) supplemental write requests issued by the firmware 120 to carry out the write requests (e.g., as a result of write amplification), (3) an estimated number of write requests that the non-volatile memory 122 can reliably handle prior to experiencing degradation, and the like. It is noted that the foregoing values are exemplary and not meant to be limiting. Moreover, for a given metric 202, each value in the collection of values can encompass a subset of values that represent aspects of the value over different periods of time, without departing from the scope of this disclosure. For example, the above-described values (1) and (2) of the write cycle information 204 can include an hourly rate, a daily rate, a weekly rate, a monthly rate, and the like. It is noted that the foregoing time periods are exemplary and not meant to be limiting. Additionally, for a given metric 202, all of the above-described values can be analyzed by the budget engine 116 using any approach to calculate values to effectively establish write budgets 117 that will maximize the availability of the non-volatile memory 122 while preserving its lifespan. For example, the budget engine 116 can be configured to average the values together, apply weights to different values, place the values into variables of equations, and so on. It is noted that the foregoing calculations are exemplary and not meant to be limiting. Accordingly, it should be understood that the foregoing notions can be applied to any of metrics 202, at any level of granularity, without departing from the scope of this disclosure.

According to some embodiments, the write cycle information 204 can identify write requests that have been processed by the storage device 118. As previously described above, the write cycle information 204 can represent numerous aspects associated with the quantity of write requests that are processed by the firmware 120. For example, the write cycle information 204 can encompass additional write requests that are processed by the storage device 118 as a result of write amplification that occurs when processing incoming write requests. Again, write amplification can occur due to fact that all pages within a given block of the non-volatile memory 122 must be completely erased before new data is written into one or more of the pages. Notably, and according to some embodiments, such erasures can be quantified and represented by the PE cycle information 206, to further-supplement the write cycle information 204. When the existing data within a pending-erase page needs to be retained within the non-volatile memory 122, additional write requests can be required to migrate the existing data to a new storage area within the non-volatile memory 122, which can be added to the write cycle information 204. In this regard, the write cycle information 204/PE cycle information 206 can be compared against a known number of operations that the storage device 118 is expected to handle without issue—e.g., a maximum write cycle capacity—in order to estimate an overall health of the non-volatile memory 122. In turn, the overall health can be considered by the budget engine 116 when generating write budgets 117 for the applications 110. For example, when the non-volatile memory 122 is in poor health during a time that it is expected to be in good or excellent health, the budget engine 116 can generate write budgets 117 that effectively reduce the number of write requests that are issued by the applications 110 in an effort to achieve the expected lifespan of the non-volatile memory 122.

As noted above, write amplification behavior can significantly affect the write cycle information 204 and the PE cycle information 206. Accordingly, the write amplification information 208 can represent an average amplification factor that is observed by the firmware 120 when processing write requests. For example, when, on average, each write request requires three additional write requests to be carried out (as a result of write amplification), the write amplification information 208 can take on a value of three. In this regard, the write amplification information 208 can impact the manner in which the budget engine 116 forecasts the degradation rate of the non-volatile memory 122. For example, when the write amplification information 208 indicates a high value for a given period of time, the budget engine 116 can reduce the write budgets 117 to help reduce the wear of the non-volatile memory 122 that otherwise will occur if the write requests are not reduced. In a contrasting example, when the write amplification information indicates a low value for a given period of time, the budget engine 116 can increase the write budgets 117 to enable the non-volatile memory 122 to be utilized at a higher rate while minimizing the impact on its expected lifespan.

According to some embodiments, the bad block information 210 can describe areas of the non-volatile memory 122 that have been identified by the firmware 120 as unreliable. This can occur, for example, due to manufacturing defects, over-wearing due to poor write distribution, physical impact, and so on. In this regard, the bad block information 210 can represent an amount of storage capacity associated with the non-volatile memory 122 that is no longer available. Additionally, the overprovisioning information 212 can indicate an area/size of the non-volatile memory 122 that has been reserved for use outside of the normal operation of the computing device 102. In particular, it is important for the storage device 118 to possess a reserved area of internal memory to ensure that the storage device 118 can remain capable of performing the data migrations that typically occur as a consequence of write amplification. In some cases, SSD manufacturers reserve a fixed area of internal memory prior to distributing their SSDs to customers. Alternatively, operating systems (OS) on computing devices within which the SSDs are placed can reserve fixed areas of memory, e.g., during formatting/OS installation procedures. In view of the foregoing, the budget engine 116 can be configured to subtract the amount of storage capacity represented by the bad block information 210—as well as the overprovisioning information 212—to identify an actual amount of available storage within the non-volatile memory 122, which can be represented by the storage capacity information 214. In this manner, the budget engine 116 can take the storage capacity information 214 into consideration when generating write budgets 117. For example, when the storage capacity information 214 indicates a low overall consumption of the available storage space within the non-volatile memory 122, the budget engine 116 can increase the write budgets 117. In particular, the write budgets 117 can be increased as the abundance of available storage space can enable future write requests to be widely distributed throughout the non-volatile memory 122, thereby reducing the overall wear on specific areas of the non-volatile memory 122 that might otherwise occur.

Additionally, the configuration type information 216 can represent various physical and operational aspects associated with the storage device 118 that impact its expected lifespan. According to some embodiments, the configuration type information 216 can identify underlying physical aspects of the non-volatile memory 122, e.g., whether the non-volatile memory 122 is formed using NOR flash, NAND flash, or the like. Moreover, the configuration type information 216 can indicate the configuration of the underlying physical aspects of the non-volatile memory 122, e.g., whether the non-volatile memory 122 is single-level cell, multi-level cell, triple-level cell, quad-level cell, and the like. Additionally, the configuration type information 216 can indicate other operational aspects associated with the non-volatile memory 122, e.g., the voltage at which the non-volatile memory 122 operates, the frequency at which the non-volatile memory 122 operates, and so on. According to some embodiments, the configuration type information 216 can be utilized by the budget engine 116 to calculate an expected lifespan for the non-volatile memory 122. For example, the budget engine 116 can decrease the write budgets 117 when the configuration type information 216 indicates that the non-volatile memory 122 is composed of NAND flash in a quad-level cell configuration, as the known lifespan of this composition has a higher rate of wear (compared to triple-level cell, multi-level cell, and single-level cell). In a contrasting example, the budget engine 116 can increase the write budgets 117 when the configuration type information 216 indicates that the non-volatile memory 122 is composed of NAND flash in a single-level cell configuration, and this composition has the lowest known rate of wear.

Additionally, the event information 218 can represent various events that occur throughout the operation of the storage device 118 that can potentially affect its expected lifespan. For example, the event information 218 can include voltage surge events that can potentially compromise the physical integrity of the non-volatile memory 122. In another example, the event information 218 can include physical impact events—e.g., when the computing device 102 is dropped—that can potentially compromise the physical integrity of the non-volatile memory 122. In yet another example, the event information 218 can include temperature change events—e.g., when the computing device 102 is placed in an extremely cold or hot environment—that can potentially compromise the physical integrity of the non-volatile memory 122. In a further example, the event information 218 can include moisture change events—e.g., when the computing device 102 is exposed to liquid—that can potentially compromise the physical integrity of the non-volatile memory 122. It is noted that the foregoing examples are not meant to be limiting, and that the event information 218 can encompass any internally or externally occurring events that can potentially impact the expected lifespan of the storage device 118. Additionally, it is noted that the computing device 102 can be configured to incorporate any components (not illustrated in FIG. 1) that enable the foregoing events to be detected, e.g., voltage sensors, temperature sensors, accelerometers, moisture sensors, and the like. In this manner, the budget engine 116 can take into account the implications of the event information 218 when generating the write budgets 117. For example, the budget engine 116 can be configured to reduce the write budgets 117 when the event information 218 indicates that several compromising events have occurred (e.g., multiple drops, water damage, etc.) that likely have reduced the expected lifespan of the storage device 118.

Additionally, the age information 220 can represent various temporal aspects associated with the storage device 118 that can potentially impact its expected lifespan. For example, the age information 220 can include a manufacture date of the non-volatile memory 122, a total runtime of the non-volatile memory 122, a number of power cycles applied to the non-volatile memory 122, and so on. In this manner, the budget engine 116 can further-estimate the expected lifespan of the non-volatile memory 122. For example, when the storage device 118 is old relative to its manufacture date, but has a low total runtime/power cycle count, the budget engine 116 can disregard the old age of the storage device 118 that might otherwise falsely indicate a poor overall health. In another example, when the storage device 118 is young relative to its manufacture date, but has a high total runtime/power cycle count, the budget engine 116 can disregard the young age of the storage device 118 that might otherwise falsely indicate an excellent overall health.

It is noted that the various metrics 202 illustrated in FIG. 2 and described above are not meant to represent an exhaustive list of information that can be analyzed by the budget engine 116 when generating the write budgets 117. On the contrary, the budget engine 116 can be configured to analyze any available information, associated with any physical, behavioral, operational, etc., aspects associated with the operation of the computing device 102 itself, the storage device 118 itself, and so on. In any case, the metrics 202 can be provided by the storage driver 114 to the budget engine 116, where, in turn, the budget engine 116 establishes respective write budgets 117 for each of the applications 110. For example, the budget engine 116 can maintain, for each application 110, an entry that identifies (1) the respective application ID 111 associated with the application 110, and (2) the respective write budget 117 generated for the application 110. It is noted that additional information can be included in the table illustrated in FIG. 2, but is being omitted in the interest of simplifying this disclosure. For example, the budget engine 116 can maintain, for each application 110, any information relevant for maintaining the respective write budget 117, e.g., a time at which the respective write budget 117 was generated, values for previously-generated write budgets 117, and the like, without departing from the scope of this disclosure. In this regard, the budget engine 116 can selectively effectively identify write budgets 117 that should be updated.

According to some embodiments, the budget engine 116 can identify the number of applications 110 associated with the computing device 102 and take this number into consideration when generating the write budgets 117. For example, when the budget engine 116 identifies that only a single application 110 is associated with the computing device 102—e.g., an application 110 that is installed locally on the computing device 102, or an application 110 that executes on another computing device but accesses the storage device 118 via the computing device 102—the budget engine 116 can provide a write budget 117 that accounts for all write requests that can safely be issued within the time frame that corresponds to the write budget 117. In contrast, when multiple applications 110 are associated with the computing device 102, the budget engine 116 can provide write budgets 117 that evenly-split the number of write requests that can safely be issued within the intended time frame that corresponds to the write budgets 117.

Additionally, it is noted that the applications 110 can be associated with varying levels of priority that affect the manner in which the budget engine 116 distributes the number of write requests that can safely be issued within the intended time frame that corresponds to the write budgets 117. For example, high-priority applications 110—e.g., foreground applications 110 that are frequently accessed by a user—can be assigned high priorities, whereas low-priority applications 110—e.g., background applications 110 that are infrequently accessed by the user—can be assigned low priorities. In this regard, the priority level for a given application 110 can serve as a weight when the budget engine 116 is generating a write budget 117 for the application 110. Additionally, some applications 110 can be exempt from operating under the requirements of the write budgets 117, e.g., daemons of the OS 108 that control the overall operation of the computing device 102, as such write budgets 117 might compromise the ability for a user to interface with the computing device 102 in the expected manner. To implement the exemptions, the storage driver 114/budget engine 116 can be configured to identify applications 110 marked as exempt, and disregard such applications 110 when generating and enforcing the write budgets 117.

With the write budgets 117 established, the storage driver 114 can effectively control the manner in which the write requests issued by the applications 110 are handled while the computing device 102 is operating. For example, some applications 110 can access their respective write budgets 117 through Application Programming Interface (API) calls that coincide with a framework that is implemented by the storage driver 114 to make the write budgets 117 available. In this manner, the applications 110 can optionally self-regulate the number of write requests that they issue in view of the current states of their respective write budgets 117 with the intention of remaining within their write budgets 117. Additionally, the applications 110 can remain uninformed of their respective write budgets 117, such that they rely on being notified by the storage driver 114 only when their write budgets 117 are approaching or have reached depletion. In either case, the write budgets 117 can contribute to preserving the expected lifespan of the storage device 118, thereby enhancing the overall user experience.

According to some embodiments, various approaches can be utilized when a given application 110 approaches or violates its respective write budget 117. According to some embodiments, the approaches can include providing a notification to a user of the computing device 102/and or a developer of the application 110, delaying an issuance of the write requests issued by the application 110 to the non-volatile memory 122, terminating the application 110, and the like. It is noted that the foregoing approaches are not meant to represent an exhaustive list of responsive behavior that can be implemented when the write budgets 117 are challenged by the applications 110. On the contrary, any reactive behavior can be utilized without departing from the scope of this disclosure, including audible/visual notifications, operational changes, information logging, and so on.

Additionally, it is noted that the budget engine 116 can be configured to monitor different conditions that indicate when the budget engine 116 should generate updated write budgets 117. For example, the budget engine 116 can be configured to update the write budgets 117 on a periodic basis (e.g., every day, every week, etc.). In another example, the budget engine 116 can be configured to update the write budgets 117 when a configuration of the applications 110 changes, e.g., an installation of a new application 110, an uninstallation of an existing application 110, a registration of a new remote application 110 (that executes on a device distinct from the computing device 102), a change in the properties (e.g., priority) of an application 110, and so on. In another example, the budget engine 116 can be configured to update the write budgets 117 in response to receiving a command, e.g., from a user of the computing device 102, an administrator of the computing device 102, a manufacturer of the computing device 102, and so on. It is noted that the foregoing examples are not meant to represent an exhaustive list of conditions that can be monitored by the budget engine 116 when determining whether the write budgets 117 should be updated. On the contrary, the conditions can take into account any number of aspects associated with the overall operation of the computing device 102 without departing from the scope of this disclosure.

It is noted that the responsibilities of the storage driver 114, the budget engine 116, and the firmware 120 can be modified to achieve the same or similar functionalities described herein without departing from the scope of this disclosure. For example, the storage driver 114 can implement all or a portion of the techniques implemented by the budget engine 116/the firmware 120 without departing from the scope of disclosure. In another example, the storage driver 114 can implement all or a portion of the responsibilities associated with managing the metrics 202 for the storage device 118 without departing from the scope of this disclosure.

Accordingly, FIGS. 1-2 provide an overview of the manner in which the computing device 102 can be configured to implement the techniques described herein, according to some embodiments. A more detailed breakdown of the manner in which the storage driver 114, the budget engine 116, and the firmware 120 can be configured to operate is provided below in conjunction with the methods illustrated in FIGS. 3-4.

Figure 3:
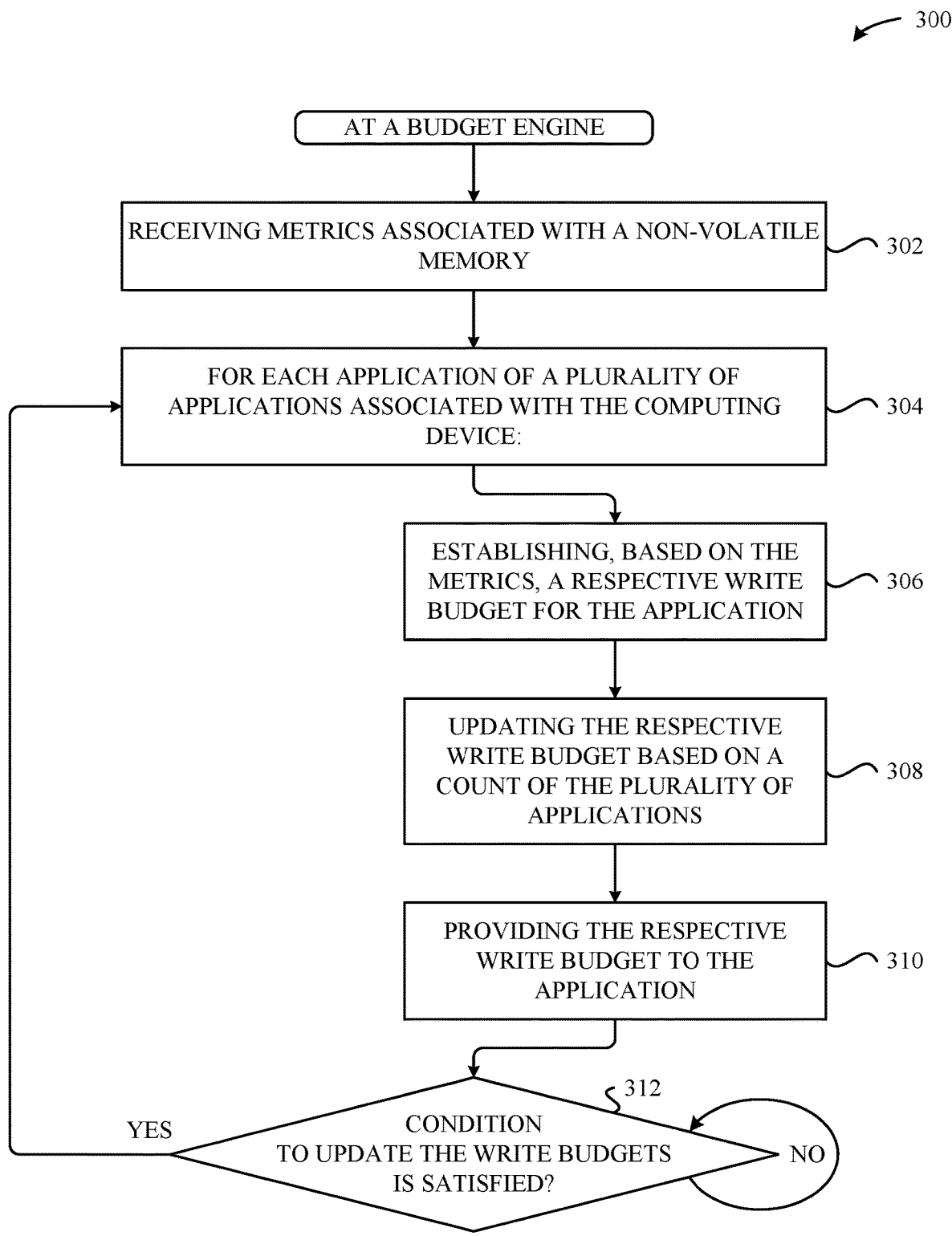
FIG. 3 illustrates a method for generating write budgets for a plurality of applications, according to some embodiments.

FIG. 3 illustrates a method 300 for generating write budgets 117 for a plurality of applications 110 associated with the computing device 102, according to some embodiments. It is noted that the responsibilities of the storage driver 114, the budget engine 116, and the firmware 120 can be modified to achieve the same or similar functionalities described herein without departing from the scope of this disclosure. However, in the interest of providing clarity, the method 300 of FIG. 3 is illustrated from the perspective of the budget engine 116.

As shown in FIG. 3, the method 300 begins at step 302, where the budget engine 116 receives metrics 202 associated with the non-volatile memory 122 of the storage device 118 (e.g., as described above in conjunction with FIGS. 1-2). At step 304, the budget engine 116 performs steps 306, 308, and 310, for each application 110 of the applications 110 associated with the computing device 102. In particular, at step 306, the budget engine 116 establishes, based on the metrics 202, a respective write budget 117 for the application 110 (e.g., as described above in conjunction with FIGS. 1-2). At step 308, the budget engine 116 updates the respective write budget 117 based on a count of the applications 110 (e.g., as described above in conjunction with FIGS. 1-2). At step 310, the budget engine 116 provides the respective write budget 117 to the application 110.

At step 312, the budget engine 116 determines whether a condition to update the write budgets 117 is satisfied (e.g., as described above in conjunction with FIGS. 1-2). If, at step 312, the budget engine 116 determines that a condition to update the write budgets 117 is satisfied, then the method 300 proceeds back to step 304, where the subsequent steps are carried out as previously described herein. Otherwise, the method 300 repeats at step 312 until the condition is satisfied.

Figure 4:
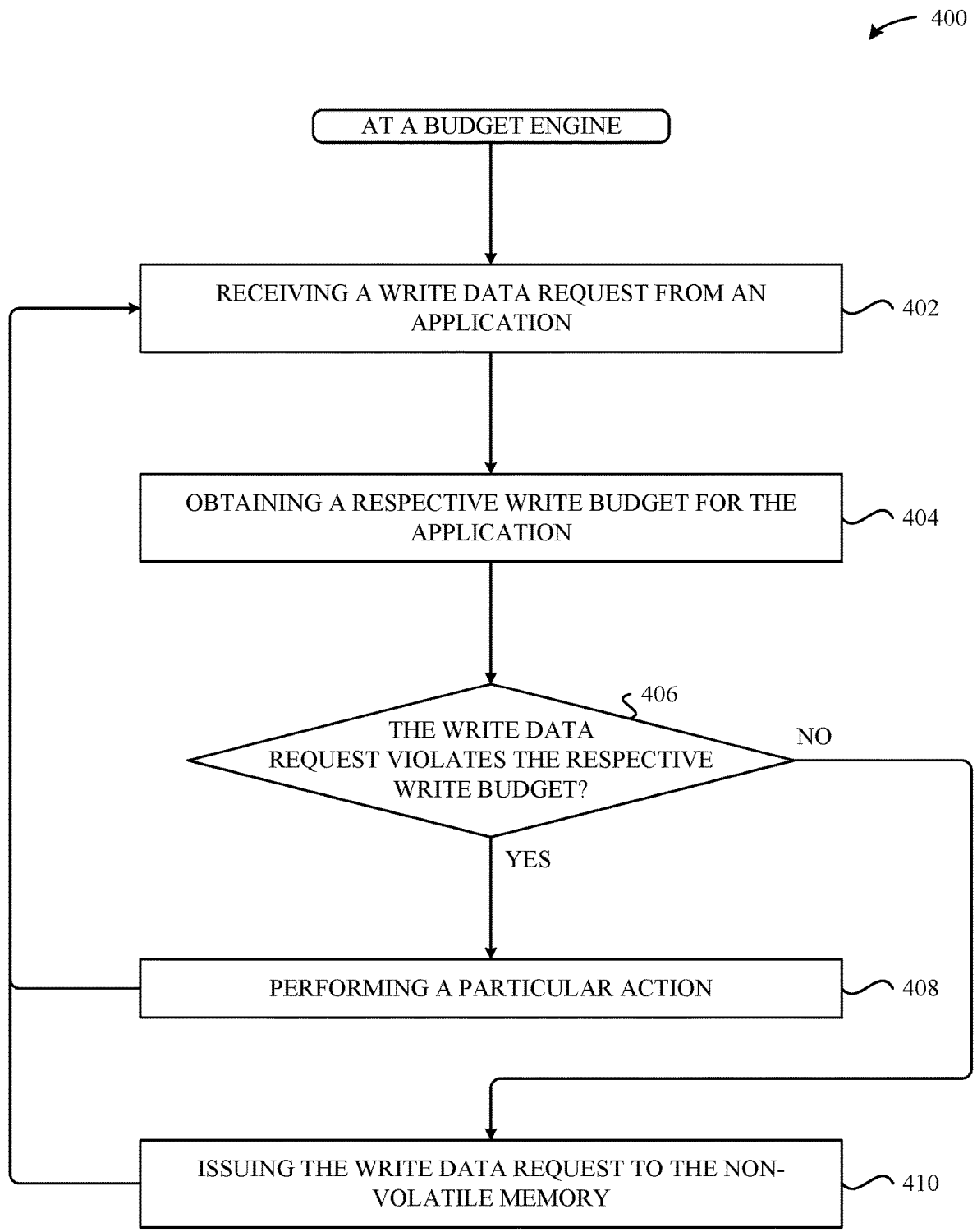
FIG. 4 illustrates a method for processing write requests issued by an application in accordance with a write budget that corresponds to the application, according to some embodiments.

FIG. 4 illustrates a method 400 for processing write requests issued by an application 110 in accordance with a write budget 117 that corresponds to the application 110, according to some embodiments. Again, it is noted that the responsibilities of the storage driver 114, the budget engine 116, and the firmware 120 can be modified to achieve the same or similar functionalities described herein without departing from the scope of this disclosure. However, in the interest of providing clarity, the method 400 in FIG. 4 is illustrated from the perspective of the budget engine 116.

According to some embodiments, and as shown in FIG. 4, the method 400 begins at step 402, where the budget engine 116 receives a write request from an application 110. At step 404, the budget engine 116 obtains a respective write budget 117 for the application 110. At step 406, the budget engine 116 determines whether the write request violates the respective write budget 117. If, at step 406, the budget engine 116 determines that the write request violates the respective write budget 117, then the method 400 proceeds to step 408, where the budget engine 116 performs a particular action (e.g., as described above in conjunction with FIGS. 1-2). However, if, at step 406, the budget engine 116 determines that the write request does not violate the respective write budget 117, then the method proceeds to step 410, where the budget engine 116 issues the write request to the non-volatile memory 122.

Figure 5:
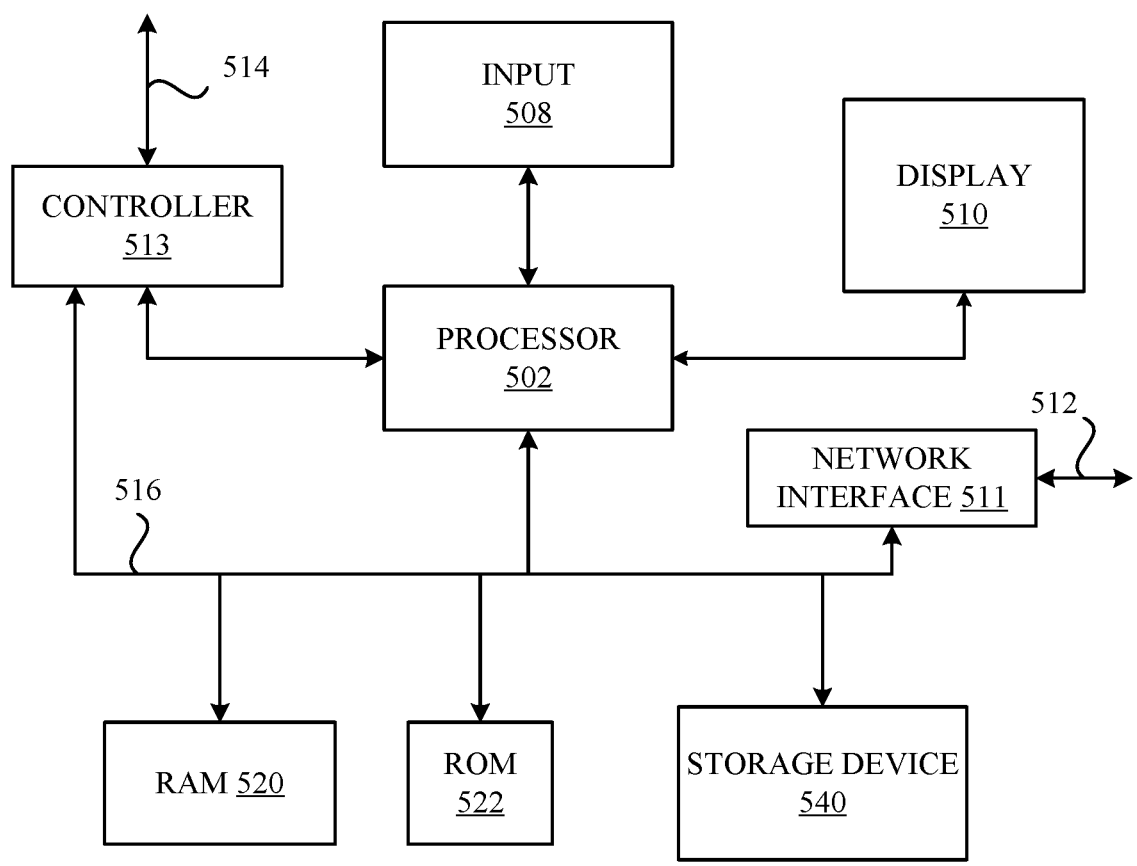
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the computing device 102 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also includes a storage device 540, which can comprise a single disk or a plurality of disks (e.g., SSDs), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for preserving an expected lifespan of a non-volatile memory that is communicably coupled with a computing device, the method comprising, at the computing device:
   receiving metrics associated with the non-volatile memory;
   for each application of a plurality of applications associated with the computing device:
      assigning, based on the metrics, a respective write budget for the application;
   receiving, from an application of the plurality of applications, a write request directed to the non-volatile memory; and
   in response to determining that the write request does not violate the respective write budget for the application:
      issuing the write request to the non-volatile memory.

2. The method of claim 1, wherein, for each application of the plurality of applications, the respective write budget is further based on a count of the plurality of applications.

3. The method of claim 1, wherein the metrics include at least one of the following properties associated with the non-volatile memory:
   write cycle information,
   program/erase (PE) cycle information,
   write amplification information,
   bad block information,
   overprovisioning information,
   configuration type information,
   storage capacity information,
   event information, or
   age information.

4. The method of claim 1, further comprising, in response to determining that the write request violates the respective write budget for the application, performing at least one of the following actions:
   providing a notification to a user of the computing device and/or a developer of the application,
   delaying an issuance of the write request to the non-volatile memory, or
   terminating the application.

5. The method of claim 4, further comprising:
   updating an overall health score associated with the application in accordance with whether the write request violates or does not violate the respective write budget for the application.

6. The method of claim 1, further comprising, in response to identifying that a condition is satisfied:
   receiving updated metrics associated with the non-volatile memory; and
   for each application of the plurality of applications associated with the computing device:
      assigning, based on the metrics, a respective updated write budget for the application.

7. The method of claim 6, wherein the condition comprises (i) a threshold amount of time passing, or (ii) receiving a command.

8. At least one non-transitory computer readable storage medium configured to store instructions that, when executed by at least one processor included in a computing device, cause the computing device to preserve an expected lifespan of a non-volatile memory that is communicably coupled with the computing device, by carrying out steps that include:
receiving metrics associated with the non-volatile memory;
for each application of a plurality of applications associated with the computing device:
assigning, based on the metrics, a respective write budget for the application;
receiving, from an application of the plurality of applications, a write request directed to the non-volatile memory; and
in response to determining that the write request does not violate the respective write budget for the application:
issuing the write request to the non-volatile memory.

9. The at least one non-transitory computer readable storage medium of claim 8, wherein, for each application of the plurality of applications, the respective write budget is further based on a count of the plurality of applications.

10. The at least one non-transitory computer readable storage medium of claim 8, wherein the metrics include at least one of the following properties associated with the non-volatile memory:
write cycle information,
program/erase (PE) cycle information,
write amplification information,
bad block information,
overprovisioning information,
configuration type information,
storage capacity information,
event information, or
age information.

11. The at least one non-transitory computer readable storage medium of claim 8, wherein the steps further include, in response to determining that the write request violates the respective write budget for the application, performing at least one of the following actions:
providing a notification to a user of the computing device and/or a developer of the application,
delaying an issuance of the write request to the non-volatile memory, or
terminating the application.

12. The at least one non-transitory computer readable storage medium of claim 11, wherein the steps further include:
updating an overall health score associated with the application in accordance with whether the write request violates or does not violate the respective write budget for the application.

13. The at least one non-transitory computer readable storage medium of claim 8, wherein the steps further include, in response to identifying that a condition is satisfied:
receiving updated metrics associated with the non-volatile memory; and
for each application of the plurality of applications associated with the computing device:
assigning, based on the metrics, a respective updated write budget for the application.

14. The at least one non-transitory computer readable storage medium of claim 13, wherein the condition comprises (i) a threshold amount of time passing, or (ii) receiving a command.

15. A computing device configured to preserve an expected lifespan of a non-volatile memory that is communicably coupled with a computing device, the computing device comprising:
at least one processor; and
at least one memory storing instructions that, when executed by the at least one processor, cause the computing device to:
receive metrics associated with the non-volatile memory;
for each application of a plurality of applications associated with the computing device:
assign, based on the metrics, a respective write budget for the application;
receive, from an application of the plurality of applications, a write request directed to the non-volatile memory; and
in response to determining that the write request does not violate the respective write budget for the application:
issue the write request to the non-volatile memory.

16. The computing device of claim 15, wherein, for each application of the plurality of applications, the respective write budget is further based on a count of the plurality of applications.

17. The computing device of claim 15, wherein the metrics include at least one of the following properties associated with the non-volatile memory:
write cycle information,
program/erase (PE) cycle information,
write amplification information,
bad block information,
overprovisioning information,
configuration type information,
storage capacity information,
event information, or
age information.

18. The computing device of claim 15, wherein the at least one processor further causes the computing device to, in response to determining that the write request violates the respective write budget for the application, performing at least one of the following actions:
provide a notification to a user of the computing device and/or a developer of the application,
delay an issuance of the write request to the non-volatile memory, or
terminate the application.

19. The computing device of claim 18, wherein the at least one processor further causes the computing device to:
update an overall health score associated with the application in accordance with whether the write request violates or does not violate the respective write budget for the application.

20. The computing device of claim 15, wherein the at least one processor further causes the computing device to, in response to identifying that a condition is satisfied:
receive updated metrics associated with the non-volatile memory; and
for each application of the plurality of applications associated with the computing device:

assign, based on the metrics, a respective updated write budget for the application.

\* \* \* \* \*